United States Patent
Yamaguchi

(10) Patent No.: US 10,870,160 B2
(45) Date of Patent: Dec. 22, 2020

(54) WIRE ELECTRIC DISCHARGE MACHINE

(71) Applicant: FANUC CORPORATION, Yamanashi (JP)

(72) Inventor: Meguru Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 228 days.

(21) Appl. No.: 15/730,058

(22) Filed: Oct. 11, 2017

(65) Prior Publication Data

US 2018/0104757 A1    Apr. 19, 2018

(30) Foreign Application Priority Data

Oct. 18, 2016   (JP) .................................. 2016-204505

(51) Int. Cl.
*B23H 11/00* (2006.01)
*B23H 1/10* (2006.01)
*B23H 7/02* (2006.01)

(52) U.S. Cl.
CPC ............. *B23H 11/003* (2013.01); *B23H 1/10* (2013.01); *B23H 7/02* (2013.01); *B23H 11/00* (2013.01)

(58) Field of Classification Search
CPC ........ B23H 11/00; B23H 11/003; B23H 1/10; B23H 7/02
USPC ............. 219/69.12, 69 M, 69 W, 69 E, 69 V, 219/69 D, 69 G; 204/224 M, 206, 129.1, 204/129.2, 129.25, 129.4, 129.5, 129.7; 226/199, 200
See application file for complete search history.

(56) References Cited

U.S. PATENT DOCUMENTS

| | | | | |
|---|---|---|---|---|
| 5,333,370 | A * | 8/1994 | Suzuki | G05B 19/4189 29/563 |
| 6,225,589 | B1 * | 5/2001 | Bartok | B23H 7/265 219/69.15 |
| 2005/0161441 | A1 * | 7/2005 | Takayama | B23H 7/02 219/69.12 |

(Continued)

FOREIGN PATENT DOCUMENTS

| | | |
|---|---|---|
| JP | S58-052035 U | 4/1983 |
| JP | H02-107429 U | 8/1990 |
| JP | H05-009830 U | 2/1993 |

(Continued)

OTHER PUBLICATIONS

JP 2012051108 A_translation.pdf (Year: 2012).*

(Continued)

*Primary Examiner* — Dana Ross
*Assistant Examiner* — Ket D Dang
(74) *Attorney, Agent, or Firm* — Studebaker & Brackett PC

(57) ABSTRACT

To provide a wire electric discharge machine which suppresses the machining speed and machining precision from declining, as well as enabling flexible handling in relation to the shapes of various workpieces, and the generation of sludge and gases which varies accompanying the progression of wire electric discharge machining. A wire electric discharge machine that performs electric discharge machining on a workpiece by causing a wire electrode and the workpiece to relatively move, includes an articulated robot, and a suction mechanism provided to a wrist leading end of the articulated robot, and suctions machining waste and gas generated by wire electric discharge machining.

7 Claims, 15 Drawing Sheets

(56) References Cited

U.S. PATENT DOCUMENTS

2008/0058986 A1* 3/2008 Moldenhauer ......... B23H 11/00
　　　　　　　　　　　　　　　　　　　700/245
2010/0096365 A1* 4/2010 Gold ....................... B23H 1/10
　　　　　　　　　　　　　　　　　　　219/69.15

FOREIGN PATENT DOCUMENTS

| JP | H6-77248 U | 10/1994 |
| JP | H6-334039 A | 12/1994 |
| JP | 2001322049 A | 11/2001 |
| JP | 2012-51108 A | 3/2012 |
| JP | 2012051108 A * | 3/2012 |
| JP | 2016-175153 A | 10/2016 |

OTHER PUBLICATIONS

An Office Action; "Notificatoin of Reasons for Refusal," dated by the Japanese Patent Office on Oct. 2, 2018, which corresponds to Japanese Patent Application No. 2016-204505 and is related to U.S. Appl. No. 15/730,058.

A Notification of Reasons for Refusal dated by the Japanese Patent Office dated Nov. 19, 2019, which corresponds to Japanese Patent Application No. 2016-204505 with English Translation.

* cited by examiner

WIRE ELECTRIC DISCHARGE MACHINE

This application is based on and claims the benefit of priority from Japanese Patent Application No. 2016-204505, filed on 18 Oct. 2016, the content of which is incorporated herein by reference.

BACKGROUND OF THE INVENTION

Field of the Invention

The present invention relates to a wire electric discharge machine.

Related Art

Conventionally, wire electric discharge machining has been known as one type of discharge machining. In wire electric discharge machining, machining of a shape profile is performed on a workpiece by causing a discharge phenomenon to occur between the workpiece and a wire electrode having electrical conductivity. The wire electric discharge machining is performed by a wire electric discharge machine. The wire electric discharge machine includes a mechanism that supports the workpiece and wire electrode, and a structure that continuously supplies the wire electrode which is consumed accompanying the discharge phenomenon, and includes a structure which controls the relative positions between the wire electrode and workpiece by way of a numerical control.

The wire electrode is wound in a state coiling around a cylindrical bobbin, and is drawn out from the bobbin by a structure which consecutively supplies the wire electrode included by the wire electric discharge machine. In addition, the wire electric discharge machine has a guide which is a structure supporting the wire electrode at an accurate position, and has a mechanism and function of controlling the tension on the wire electrode by way of numerical control. In addition, the wire electric discharge machine has a function of monitoring and controlling the state of electric discharge occurring between the wire electrode and workpiece by way of the numerical control. In addition, by making any movement command to the numerical control, the wire electric discharge machine is able to machine the shape profile into the workpiece by the wire electrode (refer to Patent Documents 1, 2 and 3).

Patent Document 1: Japanese Unexamined Utility Model Application, Publication No. H2-107429
Patent Document 2: Japanese Unexamined Utility Model Application, Publication No. H5-009830
Patent Document 3: Japanese Utility Model Application Publication No. S58-052035

SUMMARY OF THE INVENTION

It has been known that efficiently removing the machining waste (hereinafter referred to as "sludge") generated in wire electric discharge machining, and gases generated by the machining fluid supplied to the electric discharge site of the wire electrode upon electric discharge machining being electrolyzed by the electric discharge machining from the electric discharge machining part has an effect of improving machining speed and machining precision. Then, a configuration has been known that performs removal of heat generated by electric discharge, stabilization of the conductivity at the electric discharge site, and elimination of sludge and gases generated, by providing a working fluid supply structure of nozzle form to the wire electric discharge machine, and supplying the working fluid to the electric discharge site from a top face and bottom face of a workpiece.

Furthermore, as described in the above-mentioned Patent Documents 1 to 3, improvements in machining speed and machining precision have been attempted by suctioning the generated sludge and gases by a part of the working fluid supply structure, or by an added suction mechanism.

However, with the method of suctioning using a part of the working fluid supply structure, since the efficiency of working fluid supply during electric discharge machining declines, the machining speed and machining precision will decline. In addition, with the method of adding a suction mechanism, the suction mechanism is fixed to part of the wire electric discharge machine. For this reason, since movement or replacement of the suction mechanism is difficult, flexible handling in relation to the shapes for various workpieces, and the generation of sludge and gases which changes according to the progression of wire electric discharge machining is difficult.

The present invention has an object of providing a wire electric discharge machine that suppresses machining speed and machining precision from declining, as well as being capable of flexible handling in relation to the shapes for various workpieces, and the generation of sludge and gases which changes according to the progression of wire electric discharge machining.

According to a first aspect of the present invention, a wire electric discharge machine (e.g., the wire electric discharge machine 1 described later), which causes a wire electrode (e.g., the wire electrode 21 described later) and a workpiece (e.g., the work W described later) to move relatively, and performs electric discharge machining on the workpiece, includes an articulated robot (e.g., the robot 40 described later); and a suction mechanism (e.g., the suction mechanism 50 described later) that is provided to a leading end part (e.g., the wrist leading end 41 described later) of the articulated robot, and suctions machining waste (e.g., the sludge S described later) and gas (e.g., the gas G described later) generated by wire electric discharge machining.

According to a second aspect of the present invention, the wire electric discharge machine as described in the first aspect may further include a synchronous control means (e.g., the robot controller 35 described later) that synchronizes the articulated robot to movement of the wire electrode that relatively moves in relation to the workpiece.

According to a third aspect of the present invention, the wire electric discharge machine as described in the first or second aspect may further include a main body (e.g., the column 15 described later) that supports the wire electrode, in which the articulated robot may be supported by the main body.

According to a fourth aspect of the present invention, in the wire electric discharge machine as described in the first aspect, the wire electrode may be supported by an upper guide (e.g., the upper guide part 23 described later) part and a lower guide part (e.g., the lower guide part 25 described later), and the articulated robot may be able to relatively move the suction mechanism in relation to the upper guide part.

According to a fifth aspect of the present invention, in the wire electric discharge machine as described in the first aspect, the articulated robot may be able to move the suction mechanism along the wire electrode. According to a sixth aspect of the present invention, in the wire electric discharge machine as described in the first aspect, the suction mechanism may have a suction part (e.g., the suction part 51 described later) having a semi-circular ring shape and that suctions machining waste and gas generated by wire electric discharge machining. According to a seventh aspect of the present invention, in the wire electric discharge machine as described in the sixth aspect, the suction part may be disposed, relative to the wire electrode, at an opposite side in a machining direction of the workpiece by the wire electrode.

According to an eighth aspect of the present invention, in the wire electric discharge machine as described in the first aspect, the suction mechanism may have a coupling mechanism (e.g., the coupling mechanism 45 described later) that is disposed at the leading end part (e.g., the wrist leading end 41 described later) of the articulated robot, and detachably couple the leading end part of the articulated robot and a base (e.g., the base 42 described later) of the articulated robot.

According to the present invention, it is possible to provide a wire electric discharge machine that suppresses machining speed and machining precision from declining, as well as being capable of flexible handling in relation to the shapes for various workpieces, and the generation of sludge and gases which changes according to the progression of wire electric discharge machining.

DETAILED DESCRIPTION OF THE INVENTION

Figure 1:
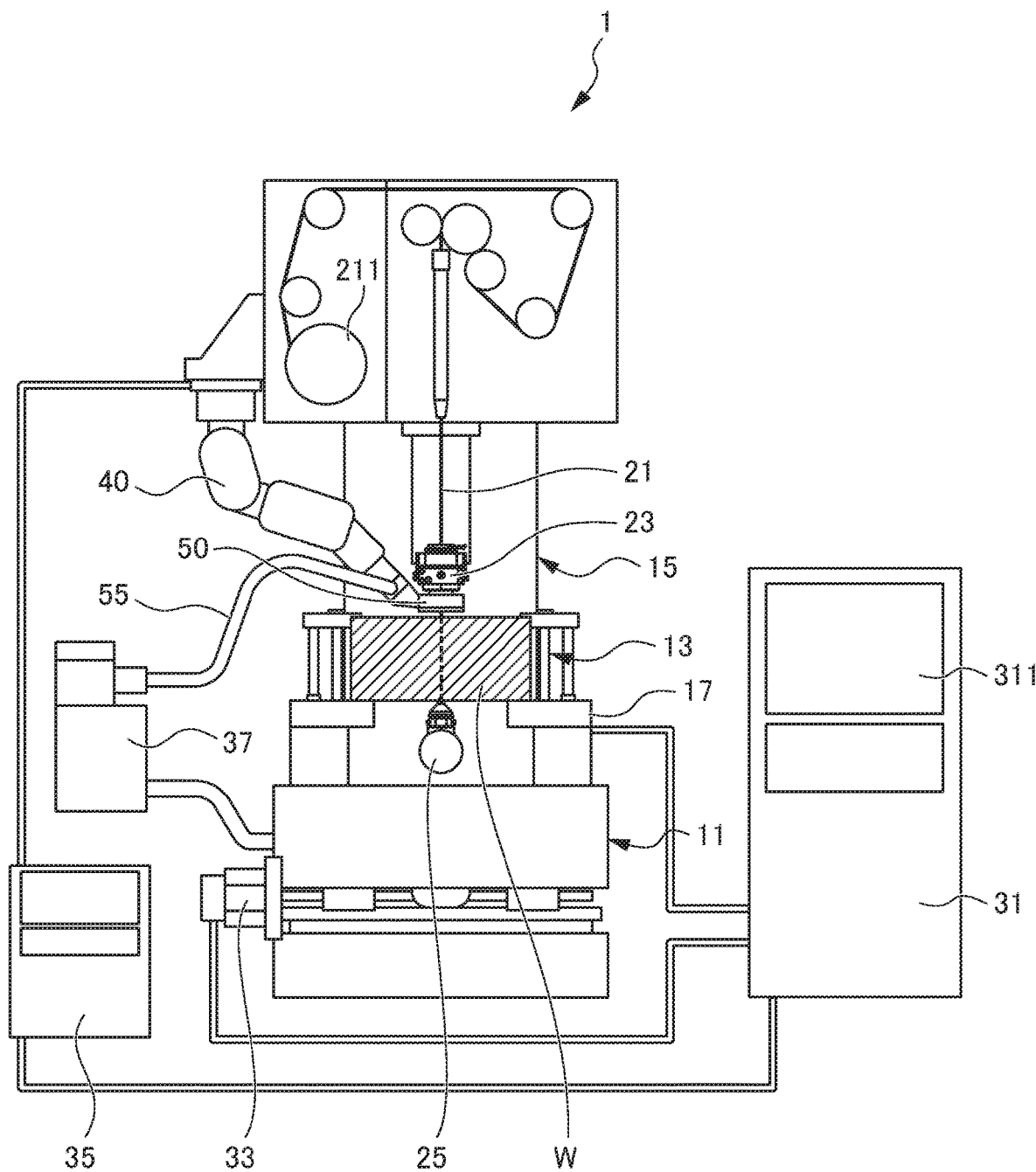
FIG. 1 is an outline front view showing a wire electric discharge machine 1 according to a first embodiment of the present invention.
Figure 2:
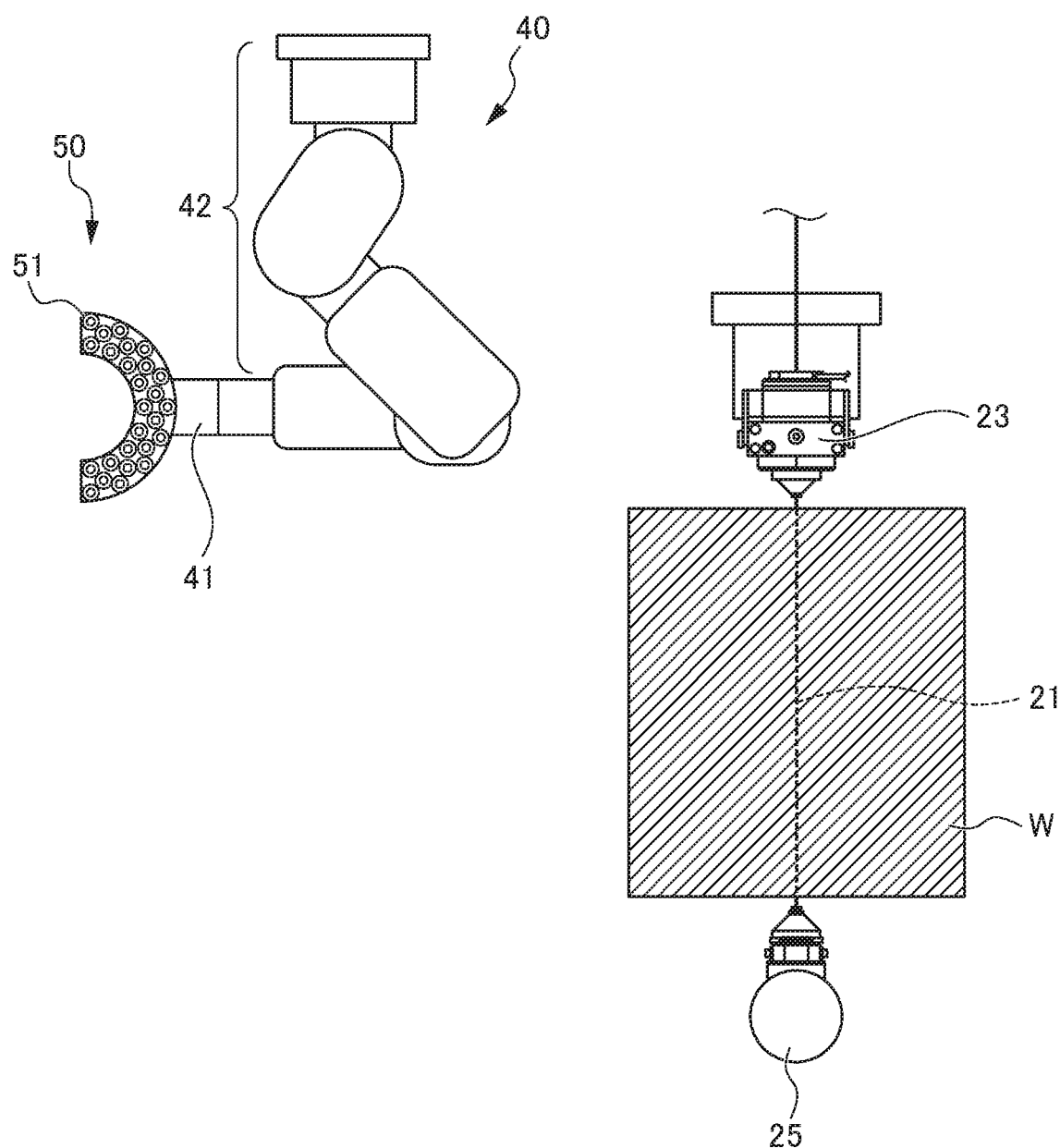
FIG. 2 is a front view showing a state in which a suction part 51 at a wrist leading end 41 of a robot 40 of a wire electric discharge machine 1 according to the first embodiment of the present invention at a position distanced from a wire electrode 21.
Figure 3:
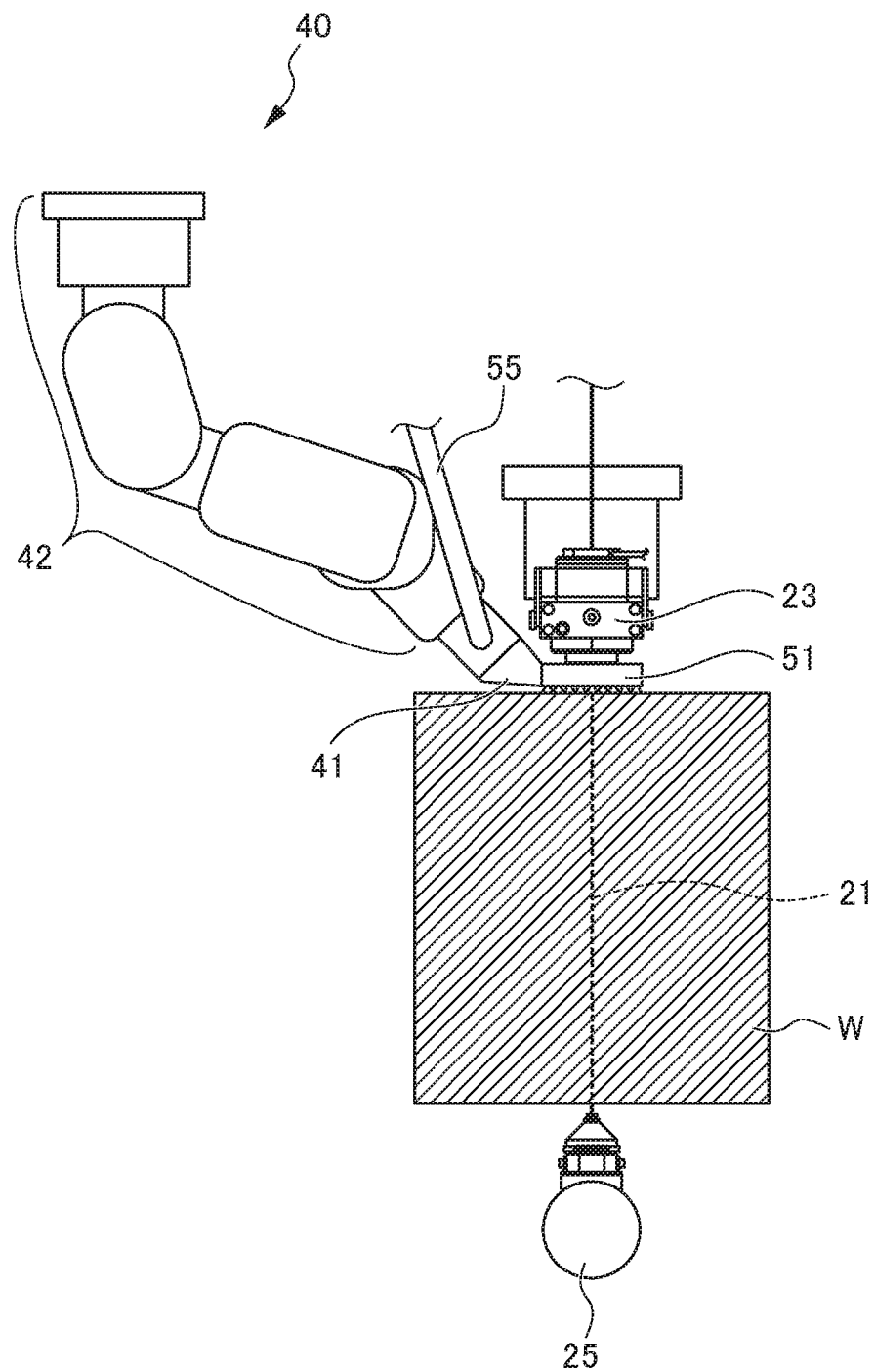
FIG. 3 is a front view showing a state in which the suction part 51 at the wrist leading end 41 of the robot 40 of the wire electric discharge machine 1 according to the first embodiment of the present invention is located in the vicinity of the wire electrode 21.

Hereinafter, a first embodiment of the present invention will be explained. For convenience of explanation, the up direction in FIG. 1 is defined as vertically upward, the opposite direction thereto is defined as downward, and these are defined as the vertical direction in the following explanation. In addition, a direction from a back side to top side of the plane of the page in FIG. 1 is defined as the machining direction of the workpiece (work W). It should be noted that, for convenience of explanation, FIG. 1 and FIG. 15 described later, are illustrated as a state with the direction of the suction part 51 of the suction mechanism 50 of the robot 40 rotated 90° around the wire electrode 21, and upon actually performing electric discharge machining, the suction part 51 can be made to face in the direction shown in FIGS. 12 to 14 described later.

The wire electric discharge machine 1 is a numerical controlled machine tool that performs electric discharge machining by way of the wire electrode 21, and as shown in FIG. 1, includes a machine stand 11, work tank 13, column 15 as a main body, work placing table 17, wire electrode 21, upper guide part 23 and lower guide part 25, numerical control 31, servomotor 33, robot controller 35, recovery mechanism 37, robot 40, and suction mechanism 50.

The wire electrode 21 is installed at the top of the column 15, and is reeled out from a wire bobbin 211 around which the wire electrode 21 is wound. In the wire bobbin 211, a predetermined torque is applied in the reverse direction to the reeling out direction of the wire electrode 21, by a feed part torque motor (not illustrated). The wire electrode 21 reeled out from the wire bobbin 211 is recovered at a wire electrode recovery box (not illustrated), by passing through a brake shoe driven by a brake motor (not illustrated), the upper guide part 23, the lower guide part 25, and a lower guide roller and feed roller (not illustrated).

The wire electrode 21, in the front view shown in FIG. 1, is supported by the upper guide part 23 arranged at the top of a work tank 13 and supported by the column 15, and supplying the working fluid to the work tank 13, and the lower guide part 25 arranged at the bottom of the work tank 13 and supported by the column 15, and supplying working fluid to the work tank 13, and is linearly stretched between the upper guide part 23 and lower guide part 25. This wire electrode 21 stretched linearly forms an electrical discharge machining part that machines the work W, and is immersed in the working fluid. The positions of the upper guide part 23 and lower guide part 25 supporting the wire electrode 21 of the wire electrical discharge machine 1 is fixed or variable according to the shape of the workpiece W, fixing method, and program in accordance with the shape of machining the workpiece W.

A work placing table 17 on which the work W is placed is provided in the work tank 13 on the machine stand 11. In an electrical discharge machining region (electrical discharge machining part) between the upper guide part 23 and lower guide part 25, the work W serving as the workpiece (not illustrated) that is the target of the electrical discharge machining is placed on the work placing table 17. The relative position between the wire electrode 21 and work placing table 17 is decided by being controlled by the numerical control 31 and the servomotor 33. A high-frequency voltage is applied from a machining power source (not illustrated) to the wire electrode 21, whereby the electrical discharge machining on the work W is done.

The robot 40 is configured by an articulated robot that is relatively mobile in relation to the upper guide part 23 and wire electrode 21. The base 42 of the robot 40 is supported by being fixed to the top of the column 15, and is relatively mobile in relation to the work W, integrally with the wire electrode 21. The wrist leading end 41 as the leading end part of the robot 40 includes the suction mechanism 50. Therefore, the robot 40 is able to relatively move a suction part 51 described later of the suction mechanism 50 in relation to the upper guide part 23, and is able to move the suction part 51 of the suction mechanism 50 along the wire electrode 21. More specifically, the robot 40 is able to move the suction part 51 in the vertical direction along the wire electrode 21, and the robot 40 is able to move the suction part 51 in the machining direction, opposite direction to the machining direction, and direction orthogonal to the machining direction, relative to the upper guide part 23.

For the robot 40, the posture and operation are controlled by the robot controller 35. The numerical control 31 and robot controller 35 are connected by wire or wirelessly, and by sharing with each other information on the target being controlled by the numerical control 31 and robot controller 35, the numerical control 31 sequentially recognizes the position and posture of the robot 40 (position and posture of suction part 51 of the suction mechanism 50 at wrist leading end 41 of the robot 40), and the robot controller 35 sequentially recognizes the positions of the wire electrode 21 and work placing table 17. Then, the numerical control 31 adjusts the positions of the upper guide part 23 and lower guide part 25 supporting the wire electrode 21, to match the position and posture of the suction part 51 of the suction mechanism 50 of the robot 40.

The relative position of the suction mechanism 50 and wire electrode 21 installed to the wrist leading end 41 of the robot 40, when the numerical control 31 and servomotor 33 of the wire electrical discharge machine 1 arrange the work placing table 17 at the position of an origin under control (machine origin) in advance, the suction mechanism 50 of the robot 40 is positioned or contacted in the vicinity of the wire electrode 21 stretched between the upper guide part 23 and lower guide part 25, and the current position is shared by storing in the numerical control 31 or robot controller 35.

Figure 4:
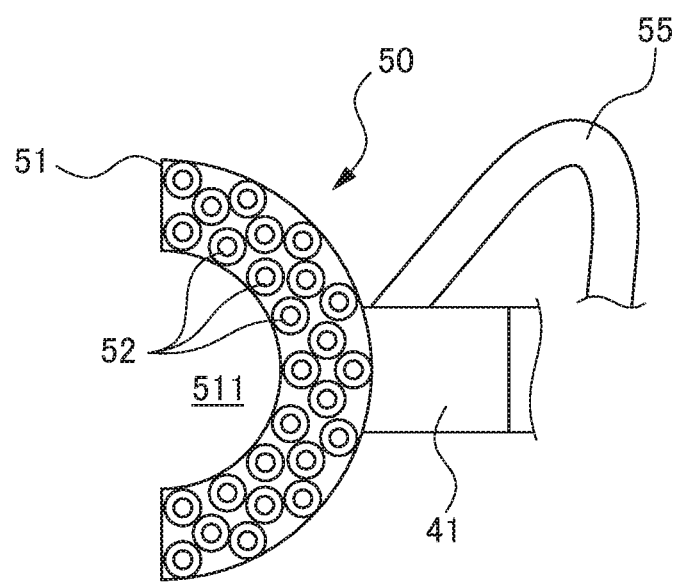
FIG. 4 is an outline bottom view showing the suction part 51 at the wrist leading end 41 of the robot 40 of the wire electric discharge machine 1 according to the first embodiment of the present invention.
Figure 5:
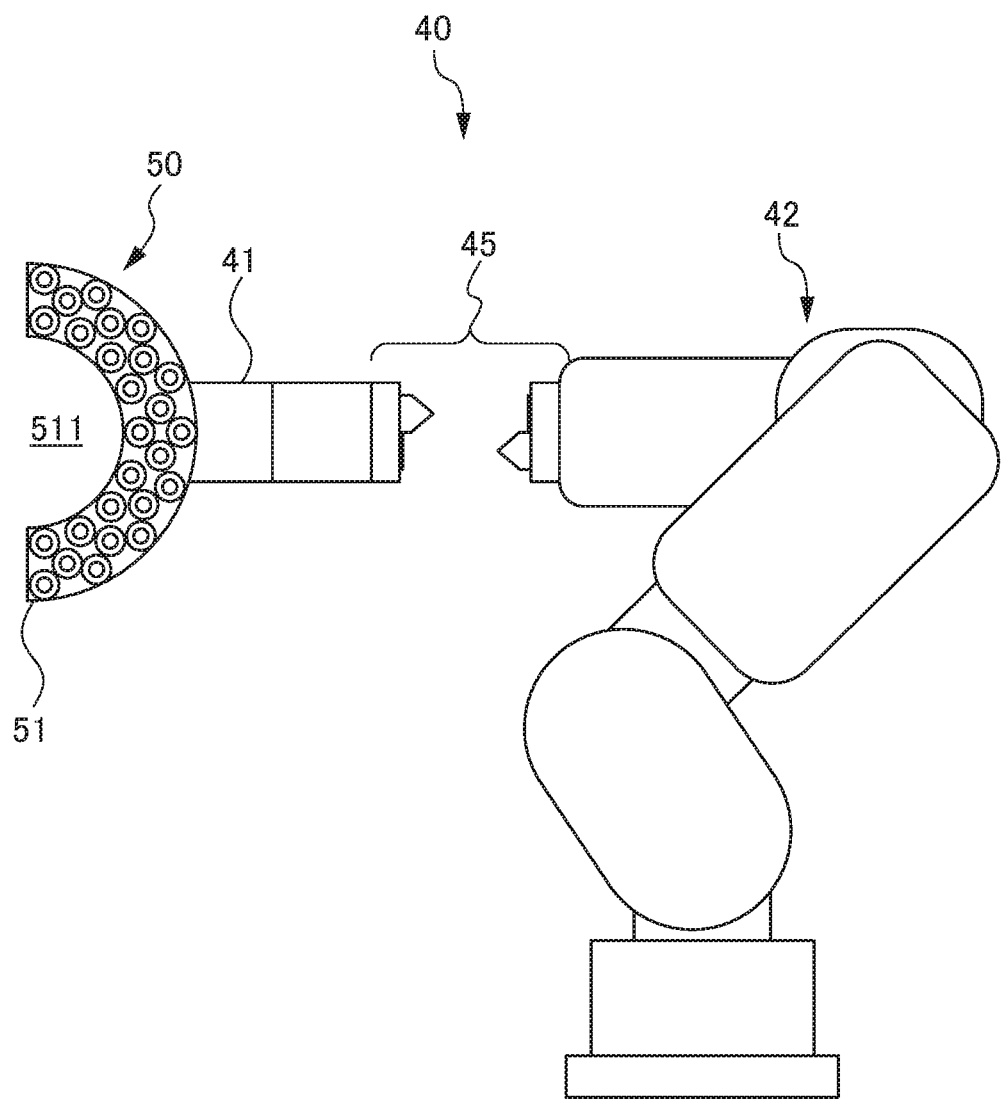
FIG. 5 is an outline view showing an aspect of the wrist leading end 41 and base 42 of the robot 40 of the wire electric discharge machine 1 according to the first embodiment of the present invention being separated.

The suction mechanism 50 has the suction part 51 including a plurality of nozzles 52 that can suction a gas G and liquid (machining fluid) or powdered solid (sludge S, etc.) generated by the machining fluid supplied from the upper guide part 23 and lower guide part 25 to the working tank 13 being electrolyzed by the electrical discharge machining. The suction part 51 of the suction mechanism 50, in the case of being necessary to suction the sludge S and gas G, is positioned in the vicinity in the upper guide part 23 by the robot 40. Then, the suction part 51 is formed in a shape surrounding the upper guide part 23, more specifically, in a substantially semi-circular ring shape, as shown in FIG. 4, etc., so that positioning the suction nozzles 52 equipped to the suction mechanism 50 in the vicinity of the upper guide part 23 becomes possible without moving the upper guide part 23. For the suction part 51, a portion at the center in the circumferential direction of the suction part 51 is connected to the leading end part 41 described later of the robot 40, and upon electric discharge machining, the lower end of the upper guide part 23 is positioned at a gap 511 surrounded by the inner circumferential face of the suction part 51, thereby assuming a positional relationship in which the lower end of the upper guide part 23 is surrounded by the suction part 51, and the wire electrode 21 is positioned in the gap 511 surrounded by the inner circumferential face of the suction part 51, thereby assuming a positional relationship in which the wire electrode 21 is surrounded by the suction part 51.

The plurality of nozzles 52 is provided over the entire surface on the lower face of the substantially semi-circular suction part 51, and is connected to the recovery mechanism 37 by a pipe member 55, as shown in FIG. 1. The recovery mechanism 37 includes a mechanism and function of returning the sludge S and gas G absorbed from the nozzles 52 of the suction mechanism 50 to the wire electrical discharge machine 1. The recovery mechanism 37 is connected by wire or wirelessly with the numerical control 31, and the pressure and flowrate at which the suction mechanism 50 connected to the pipe member 55 recovers the sludge S and gas G is controlled by the numerical control 31.

As mentioned before, the positions of the upper guide part 23 and lower guide part 25 supporting the wire electrode 21 of the electric discharge machine 1 are fixed or variable according to the shape of the work W or fixing method, and the program in accordance with the shape in which to machine the work W. According to the positions of the upper guide part 23 and lower guide part 25, the relative position with the upper guide part 23 and lower guide part 25 relative to the suction part 51 of the suction mechanism 50 is maintained by changing the posture of the robot 40.

The information related to the position and posture of the robot 40 and the suction mechanism 50 at the wrist leading end 41 is stored in the numerical control 31. The operator of the wire electric discharge machine 1 is able to confirm the operation and operation trajectory of the robot 40 and suction part 51 of the wrist leading end 41 according to the shape of the machined member to be machined, by way of the display on the display 311 of the numerical control 31.

The robot 40 has the coupling mechanism 45 which detachably couples the wrist leading end 41 of the articulated robot, and the base 42 of the articulated robot. More specifically, the wrist leading end 41 of the robot 40 is detachable relative to the base 42 of the robot 40. The base-side end of the wrist leading end 41 and the leading end-side end of the base 42 respectively have projections 451, 461; rotating engagement members 452, 462 serving as guides on a male side; rotating engagement member engaging spaces 4532, 4632 which enable inserting the rotating engagement members 452, 462 whereby the rotating engagement members 452, 462 are rotatable; projection accommodating spaces 4531, 4631 serving as guides on a female side capable of housing the projections 451, 461; release rods 454, 464 which cause the rotating engagement members 452, 462 to rotate; and return springs 456, 466 which bias the release rods 454, 464 in a direction returning the rotating engagement members 452, 462 to the initial position.

Figure 6:
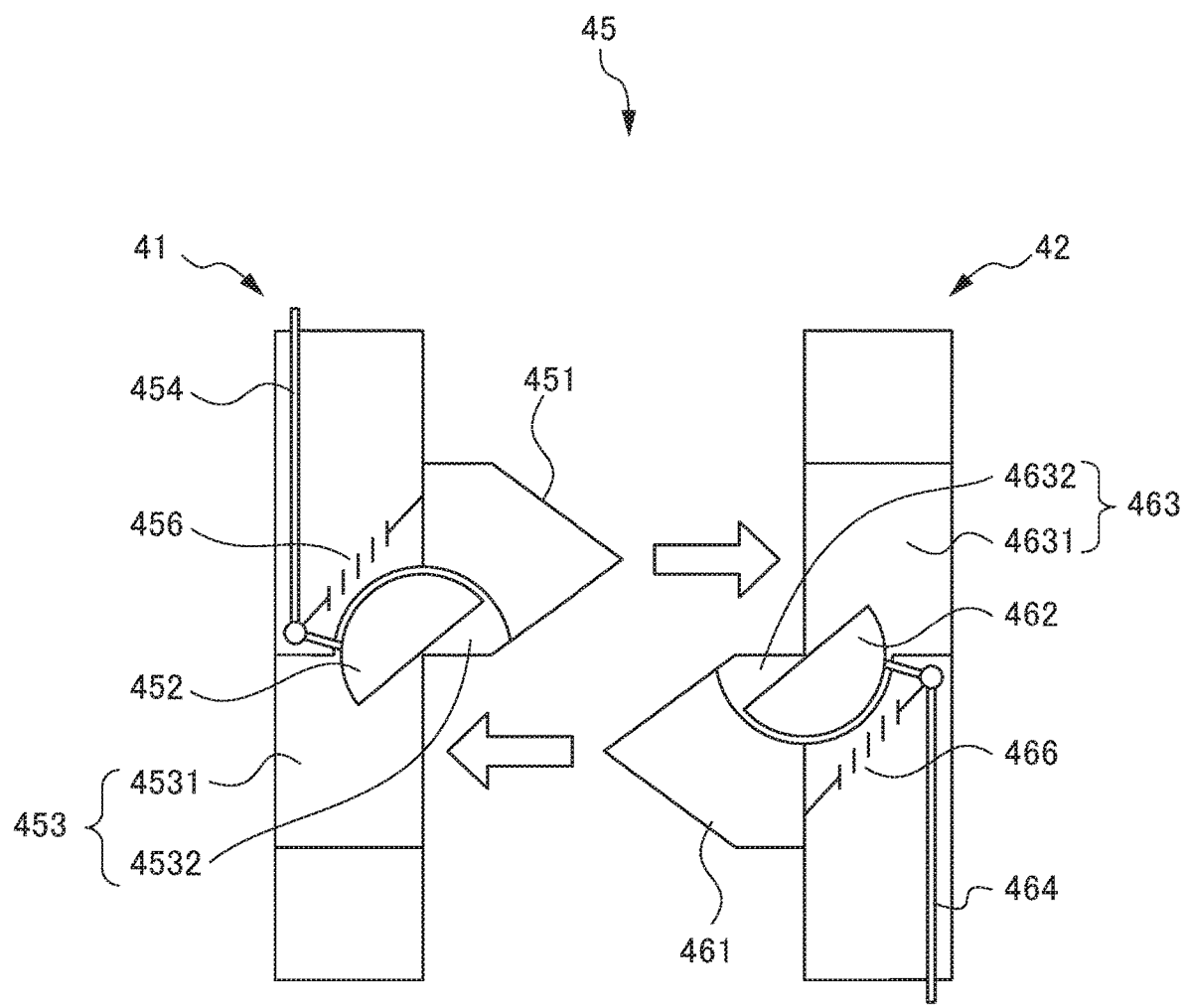
FIG. 6 is an enlarged view of a coupling mechanism 45 showing an aspect of the wrist leading end 41 and base 42 of the robot 40 of the wire electric discharge machine 1 according to the first embodiment of the present invention being separated.
Figure 8:
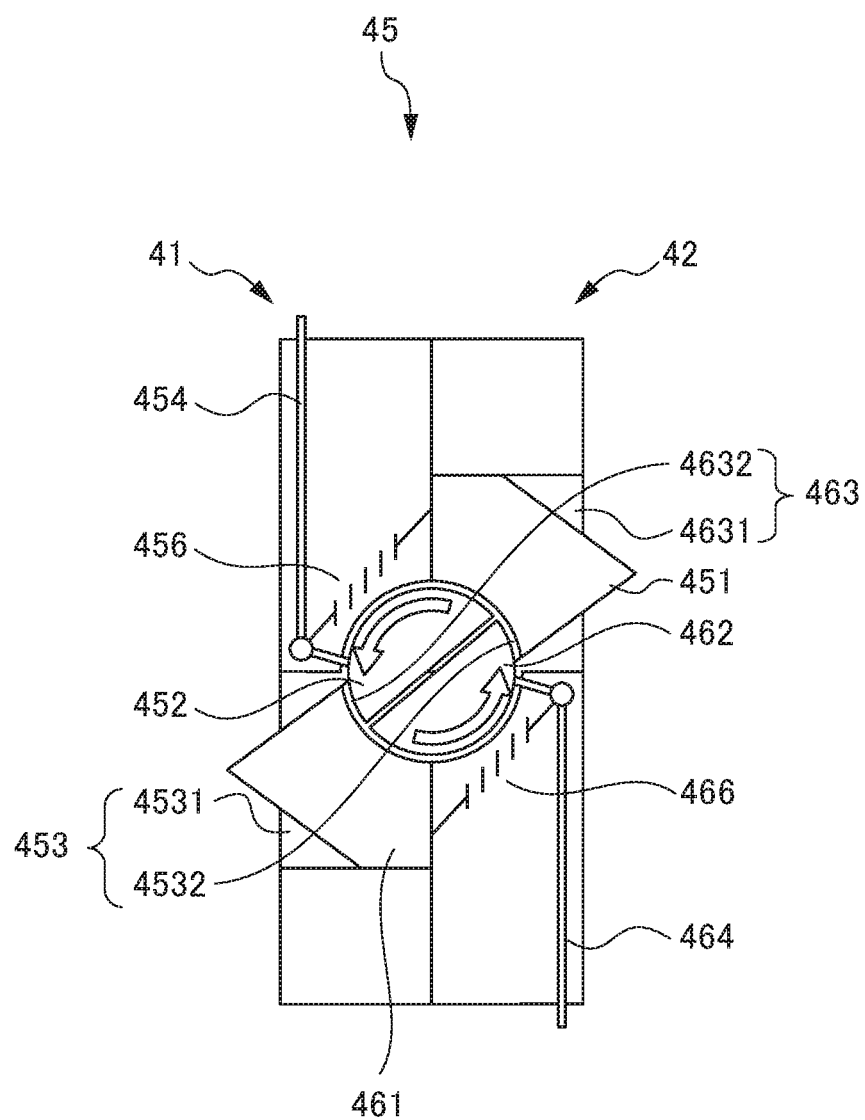
FIG. 8 is a principal part enlarged view of the coupling mechanism 45 showing an aspect of the wrist leading end 41 and base 42 of the robot 40 of the wire electric discharge machine 1 according to the first embodiment of the present invention being connected.

As shown in FIG. 6, etc., the projection 451 of the wrist leading end 41 projects in the direction of the base 42, and when the wrist leading end 41 is connected to the base 42, is accommodated in the projection accommodating space 4631 of an engaged part, as shown in FIG. 8. In addition, the projection 461 of the base 42 projects in the direction of the wrist leading end 41, and when the wrist leading end 41 is connected to the base 42, as shown in FIG. 8, is accommodated in a projection accommodating space 4531 of the engaged part, as shown in FIG. 8.

The rotating engagement member 452 of the wrist leading end 41 is rotatably supported by the wrist leading end 41. The cross-sectional shape in the rotational axis direction view of the rotating engagement member 452 is semi-circular as shown in FIG. 6, etc., and is accommodated in the rotating engagement member engaging space 4532, which has a semi-circular shape having a radius slightly larger than the rotating engagement member 452 in the same direction view. To the rotating engagement member 452, one end of the release rod 454 is connected, and the release rod 454 is biased by the return spring 456 constituted by a compression spring, whereby the rotating engagement member 452 is accommodated in the rotating engagement member engaging space 4532, in a position relationship rotated on the order of about 45° relative to the rotating engagement member engaging space 4532, as shown in FIG. 6. The state of the rotating engagement member 452 accommodated in this way is the initial state of the rotating engagement member 452.

The rotating engagement member 462 of the base 42 is rotatably supported by the base 42. The cross-sectional shape in the rotational axis direction view of the rotating engagement member 462 is a semi-circular shape, and is accommodated in the rotating engagement member engaging space 4632 having a semi-circular shape with a radius slightly larger than the rotating engagement member 462 in the same direction view. To the rotating engagement member 462, the release rod 464 is connected, and the release rod 464 is biased by the return spring 466 constituted by a compression spring, whereby the rotating engagement member 462 is accommodated in the rotating engagement member engaging space 4632 in a positional relationship rotated on the order of about 45° relative to the rotating engagement member engaging space 4632, as shown in FIG. 6. The state of the rotating engagement member 462 accommodated in this way is the initial state of the rotating engagement member 462.

Figure 9:
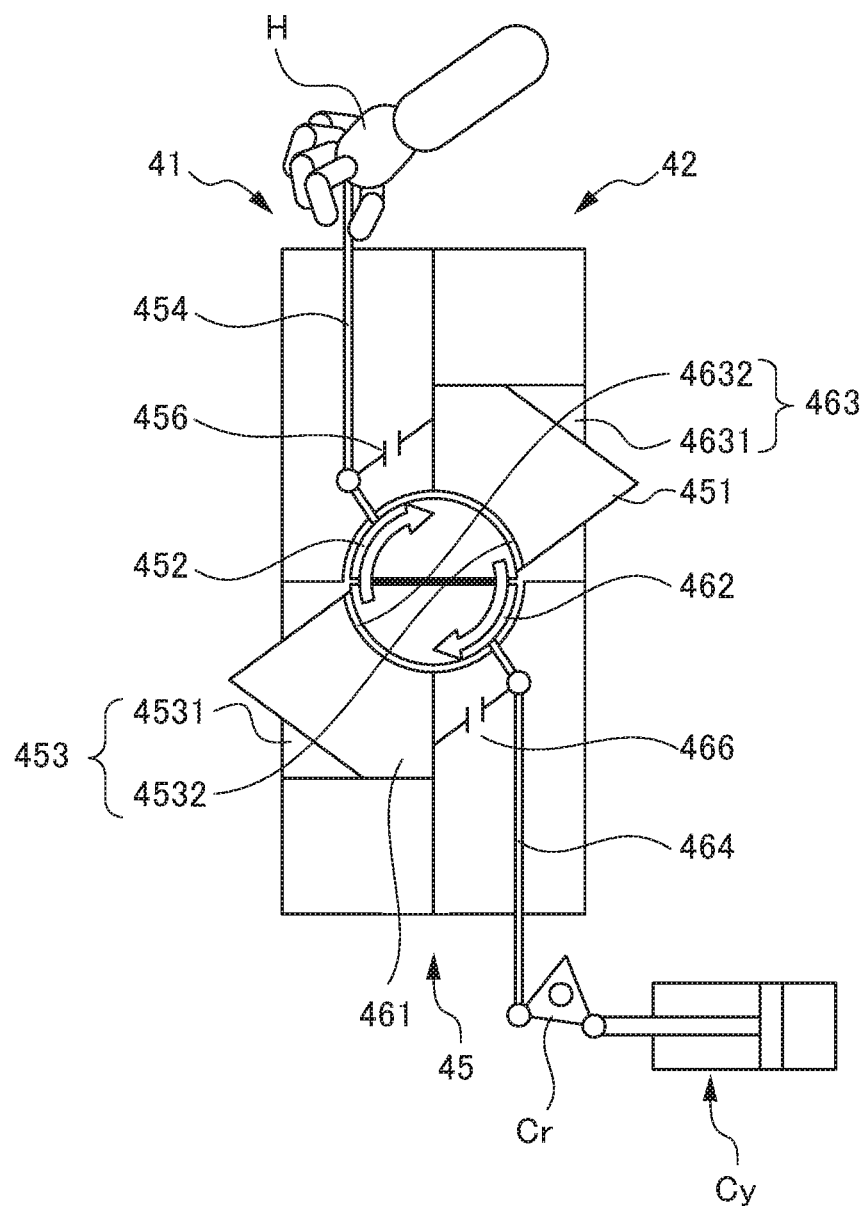
FIG. 9 is a principal part enlarged view of the coupling mechanism 45 showing an aspect of the rotating engagement member 452 of the wrist leading end 41 and the rotating engagement member 462 of the base 42 being made to rotate, in a state in which the wrist leading end 41 and base 42 of the robot 40 of the wire electric discharge machine 1 according to the first embodiment of the present invention being connected.

As shown in FIG. 9, the other end part of the release rods 464, 454 can connect a pneumatic cylinder Cy, and the operator of the wire electric discharge machine 1 can operate by hand H. By the other end part of the release rods 454, 464 being pulled, the rotation engagement members 452, 462 rotate to assume a positional relationship rotating matching with the rotation engagement member engagement spaces 4532, 4632. According to the biasing force by the return springs 456, 466, the rotating engagement members 452, 462 rotate to return to the initial state.

Figure 7:
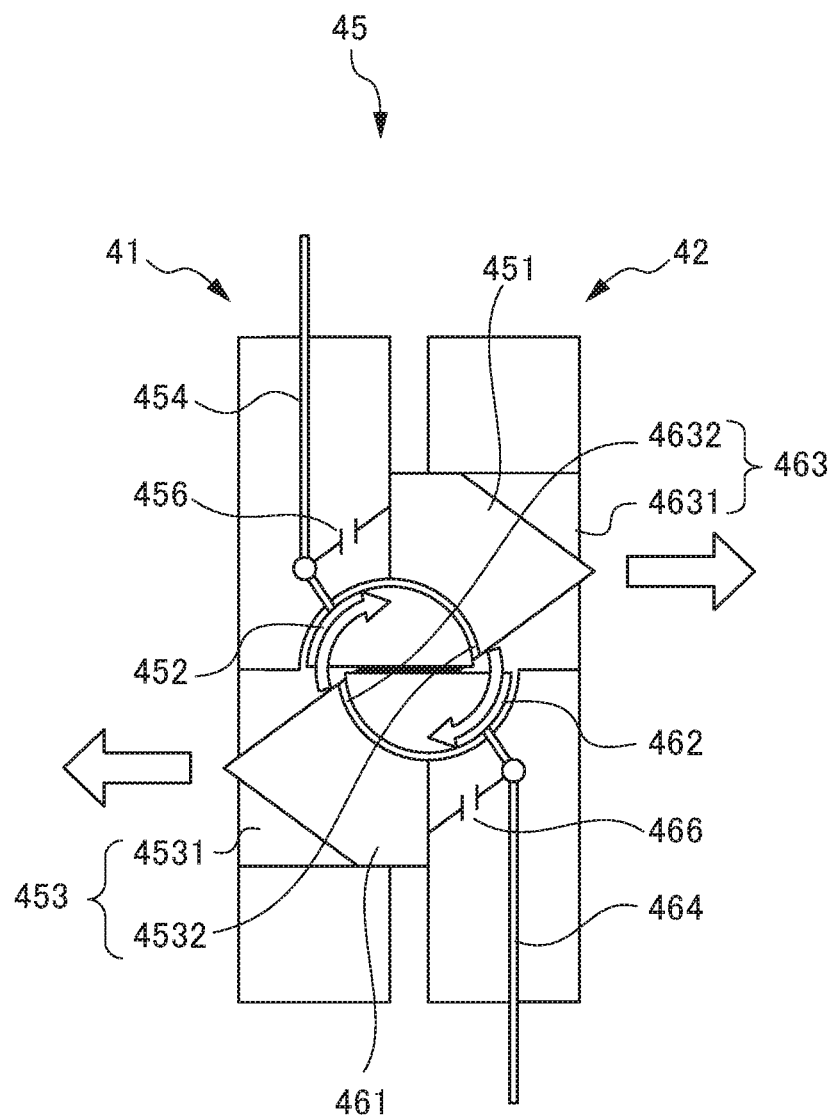
FIG. 7 is a principal part enlarged view of the coupling mechanism 45 showing an aspect of a rotating engagement member 452 of the wrist leading end 41 and a rotating engagement member 462 of the base 42 of the robot 40 of the wire electric discharge machine 1 according to the first embodiment of the present invention being rotated and abutting each other at the faces.

Hereinafter, the coupling between the wrist leading end 41 of the robot 40 and the base 42 of robot 40, and the detachment operation will be explained. As shown in FIG. 6, when the wrist leading end 41 of the robot 40 and the base 42 of the robot 40 are detached, and the rotating engagement members 452, 462 are at the initial position, the wrist leading end 41 and base 42 of the robot 40 are made to approach each other. Then, as shown in FIG. 7, the projection 451 of the wrist leading end 41 is inserted in the projection accommodating space 4631 of the base 42, as well as the projection 461 of the base 42 being inserted in the projection accommodating space 4531 of the wrist leading end 41. When this is done, the rotating engagement member 452 of the wrist leading end 41 and the rotating engagement member 462 of the base 42 abut each other, whereby each rotates to enter a state in which faces forming the diameter of the rotating engagement members 452, 462 abut against each other at the faces, as shown in FIG. 7.

Then, by further causing the wrist leading end 41 and base 42 of the robot 40 to approach each other, as shown in FIG. 8, the rotating engagement members 452, 462 of the wrist leading end 41 and base 42 rotate, a part of the rotating engagement member 452 of the wrist leading end 41 engages by entering the rotating engagement member engaging space 4632 of the base 42, and part of the rotating engagement member 462 of the base 42 engages by entering the rotating engagement member engaging space 4532 of the wrist leading end 41. The wrist leading end 41 of the robot 40 is thereby coupled and fixed to the base 42 of the robot 40.

Next, as shown in FIG. 8, in order to establish a detached state from the state in which the wrist leading end 41 of the robot 40 is coupled to the base 42 of the robot 40, first, the pneumatic cylinder Cy is connected to the other end of the release rod 464 of the base 42 of the robot 40 via a triangular crank member K, as shown in FIG. 9. Then, the pneumatic cylinder Cy is driven to pull the release rod 464 of the base 42 of the robot 40, as well as pulling the release rod 454 of the wrist leading end 41 of the robot 40 by the hand H of the operator of the wire electric discharge machine 1. The entirety of the rotating engagement member 452 of the wrist leading end 41 thereby enters a state entering the rotating engagement member engaging space 4532 of the wrist leading end 41, and the entirety of the rotating engagement member 462 of the base 42 enters a state entering the rotating engagement member engaging space 4632 of the base 42. As a result thereof, it enters a state enabling the wrist leading end 41 of the robot 40 to distance from the base 42 of the robot 40.

Figure 10:
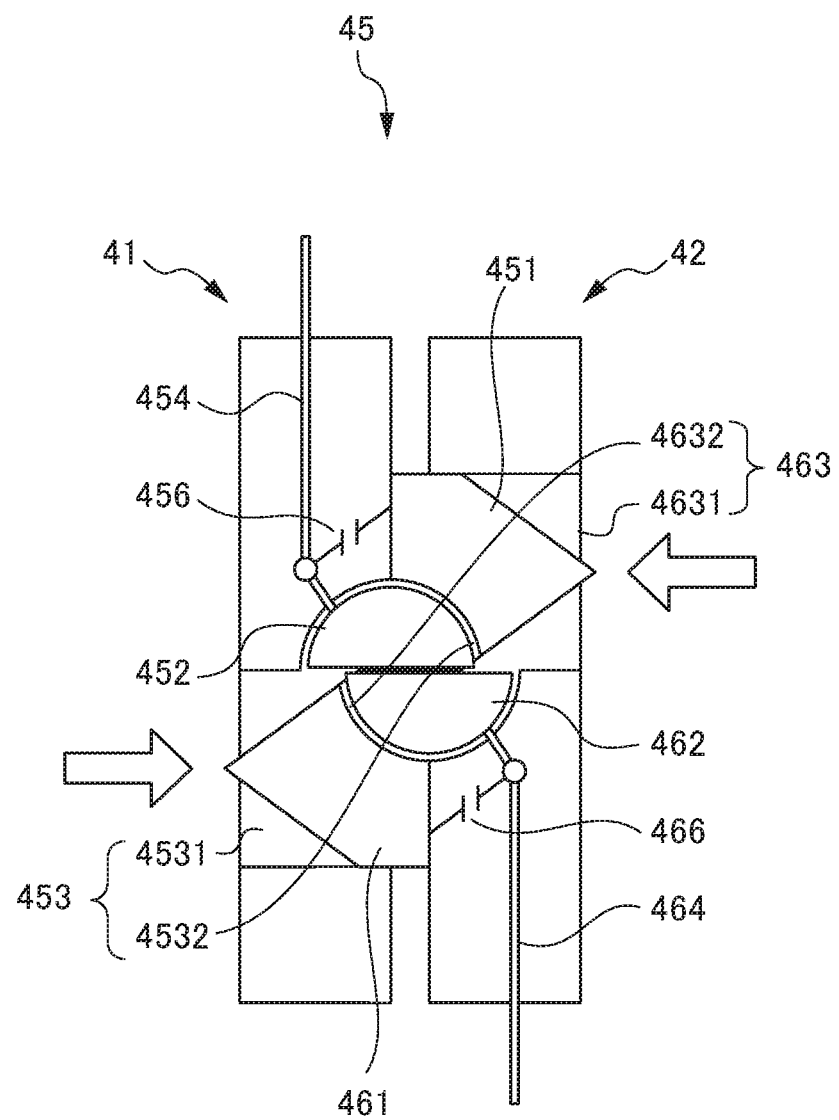
FIG. 10 is a principal part enlarged view of the coupling mechanism 45 showing an aspect of the wrist leading end 41 starting to separate from the base 42 in a state of the rotating engagement member 452 of the wrist leading end 41 and the rotating engagement member 462 of the base 42 of the robot 40 of the wire electric discharge machine 1 according to the first embodiment of the present invention being rotated.
Figure 11:
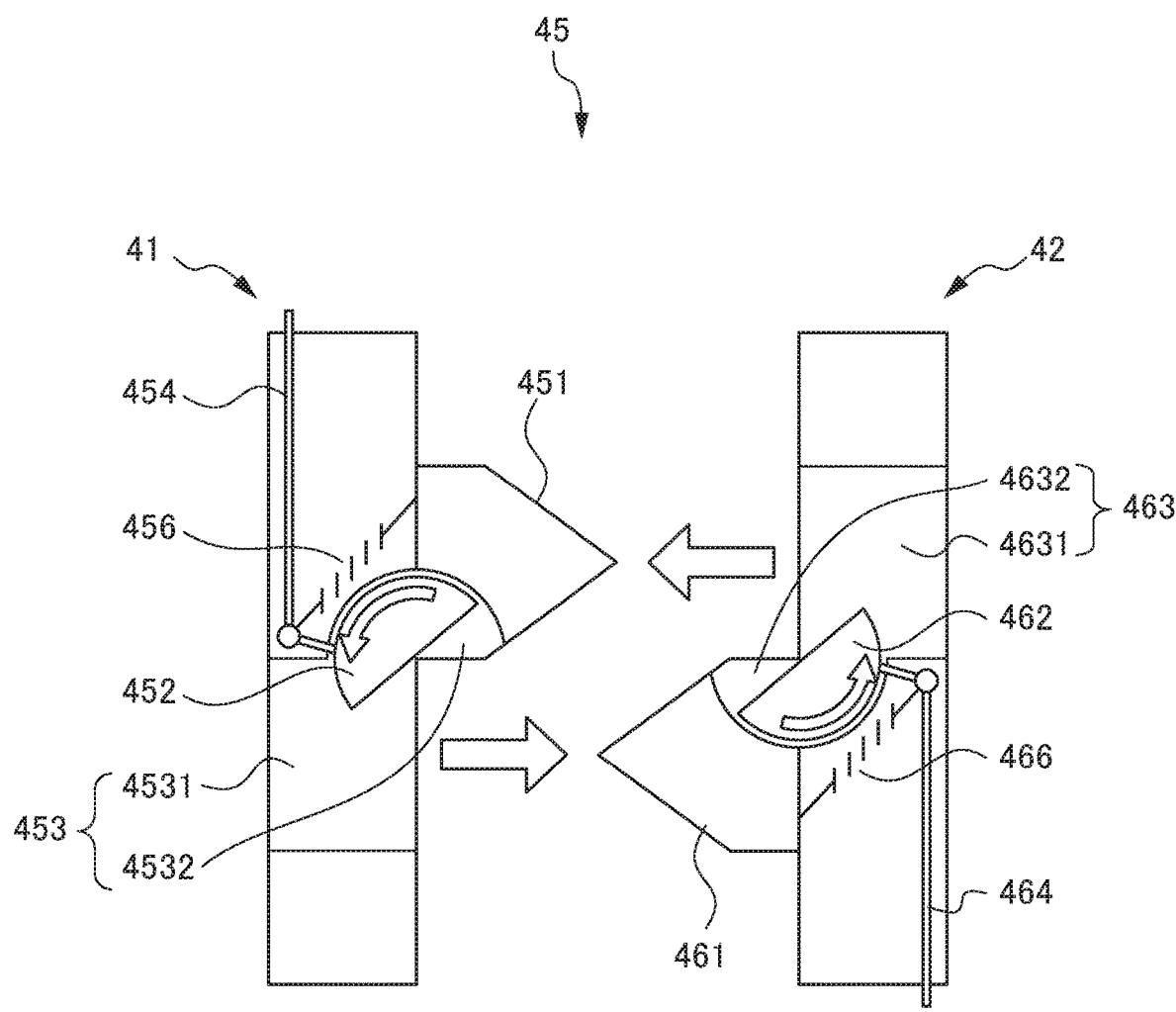
FIG. 11 is a principal part enlarged view of the coupling mechanism 45 showing an aspect of the wrist leading end 41 and base 42 of the robot 40 of the wire electric discharge machine 1 according to the first embodiment of the present invention being detached.

Next, as shown in FIG. 10, the wrist leading end 41 of the robot 40 distances from the base 42 of the robot 40, and enters a state in which the rotating engagement member 452 of the wrist leading end 41 of the robot 40 and the rotating engagement member 462 of the base 42 of the robot 40 are not abutting, as shown in FIG. 11, and further enters a state in which the projection 451 of the base 42 is extracted from the projection accommodating space 4531 of the wrist leading end 41, and the projection 451 of the wrist leading end 41 is extracted from the projection accommodating space 4631 of the base 42. The release rods 454, 464 are thereby brought back by the biasing force by the return springs 456, 466, and the rotating engagement members 452, 462 rotate to return to the initial state.

Figure 12:
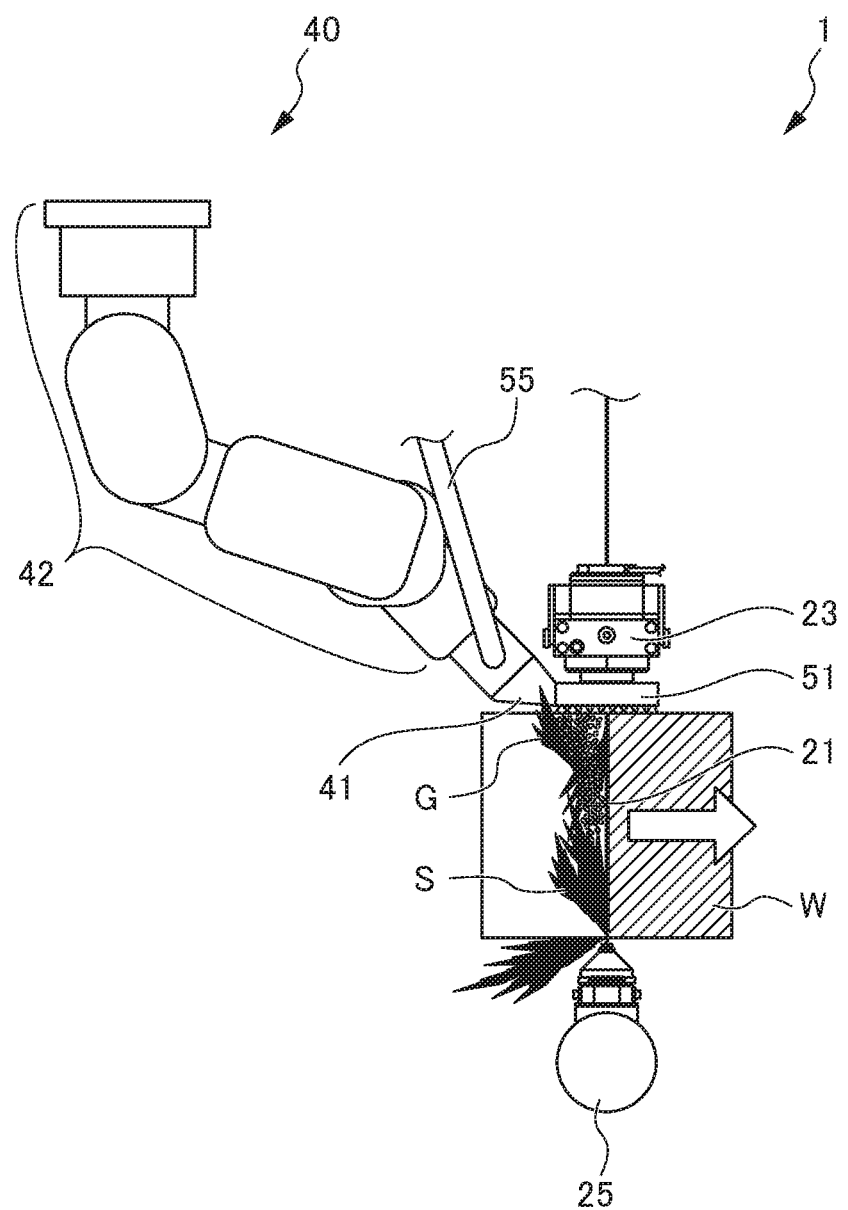
FIG. 12 is a principal part cross-sectional view showing an aspect of a work W having a fixed thickness in the vertical direction being electric discharge machined by the wire electric discharge machine 1 according to the first embodiment of the present invention.

Next, electric discharge machining on the work W by the wire electrical discharge machine 1 will be explained. As shown in FIG. 12, upon performing electric discharge machining on a work W having a fixed thickness in the vertical direction, the work placing table 17 is made to move so that the work W relatively moves in relation to the wire electrode 21 to the right direction in FIG. 12. In other words, the machining direction of the work W is the direction from the left towards the right in FIG. 12, and the work W is machined relative to the wire electrode 21 in this direction.

In this case, the suction part 51 is arranged relative to the wire electrode 21 at the opposite side in the machining direction of the work W by the wire electrode 21, i.e. left side relative to the wire electrode 21 in FIG. 12, and an opening part of the suction part 51 of a substantially semi-circular shape (portion on the left side of the suction part 51 shown in FIG. 4) is arranged in a state facing to the right. The sludge S generated by electric discharge machining is contained in the machining fluid, together with the gas G generated by the machining fluid supplied to the work tank 13 (refer to FIG. 1) from the upper guide part 23 and lower guide part 25 being electrolyzed by the electric discharge machining, and is discharged to the opposite side in the machining direction as shown in FIG. 12 (left side of the wire electrode 21); however, such sludge S and gas G is suctioned from the nozzle 52 of the suction part 51, and recovered in the recovery mechanism 37 (refer to FIG. 1). In the recovery mechanism 37, the working fluid is filtered and supplied again to the upper guide part 23 and lower guide part 25 via a pipe member not illustrated.

Upon performing the electric discharge machining on the work W in which the thickness in the vertical direction has a thick portion and a thin portion, the suction part 51 is arranged on the same side, relative to the wire electrode 21, in the machining direction of the work W by the wire electrode 21. In other words, FIGS. 13 and 14, illustrate so that the work W relatively moves in relation to the wire electrode 21 to the reverse direction from the direction shown in FIG. 12; however, the suction part 51 is arranged at the same side relative to the wire electrode 21 as the machining direction of the work W by the wire electrode 21, i.e. left side relative to the wire electrode 21 in FIG. 13, and the opening part of the suction part 51 of substantially semi-circular shape is arranged in a state facing to the right.

Figure 13:
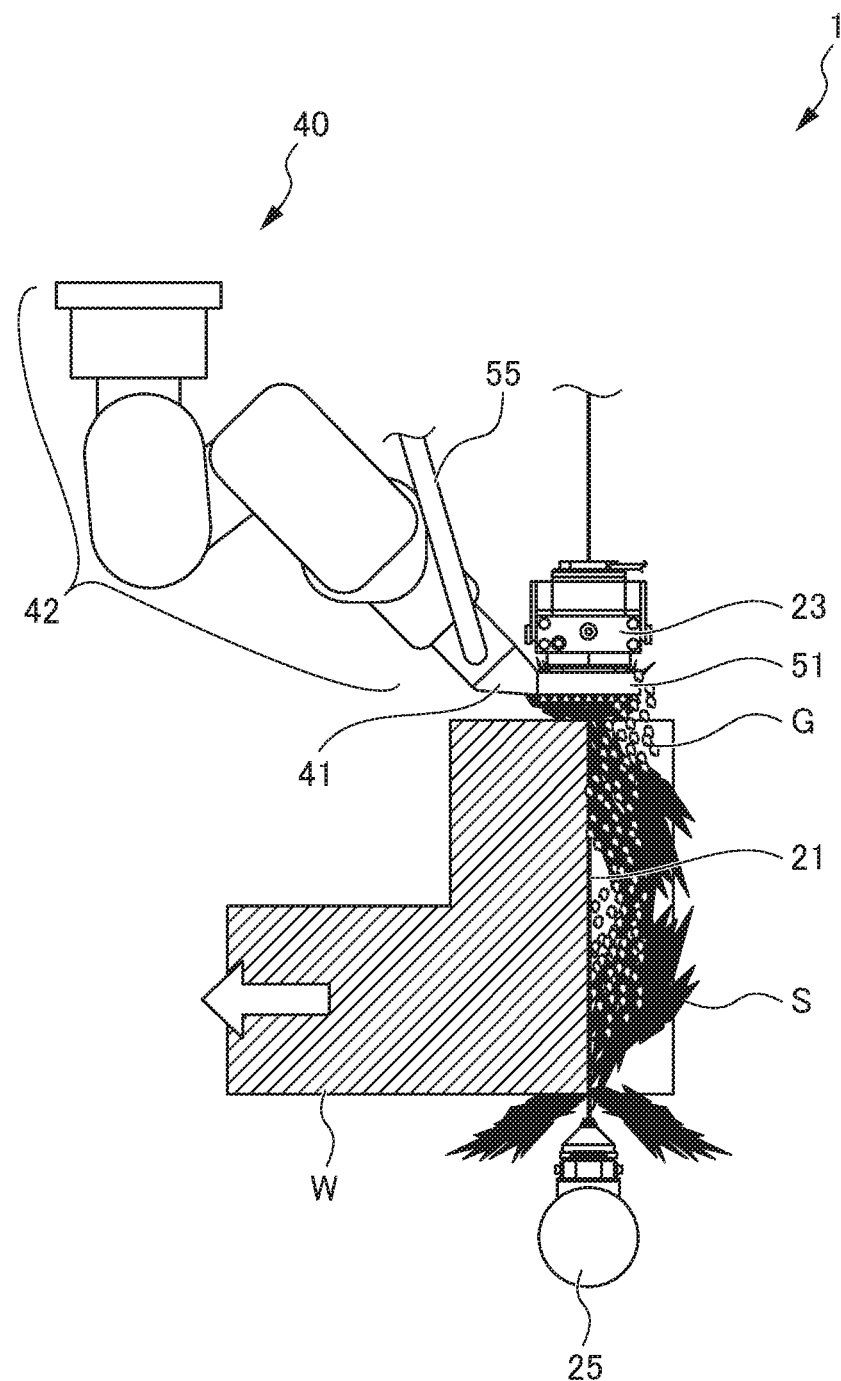
FIG. 13 is a principal part cross-sectional view showing an aspect of a thick portion of a work W in which the thickness in the vertical direction partially differs being electric discharge machined by the wire electric discharge machine 1 according to the first embodiment of the present invention.
Figure 14:
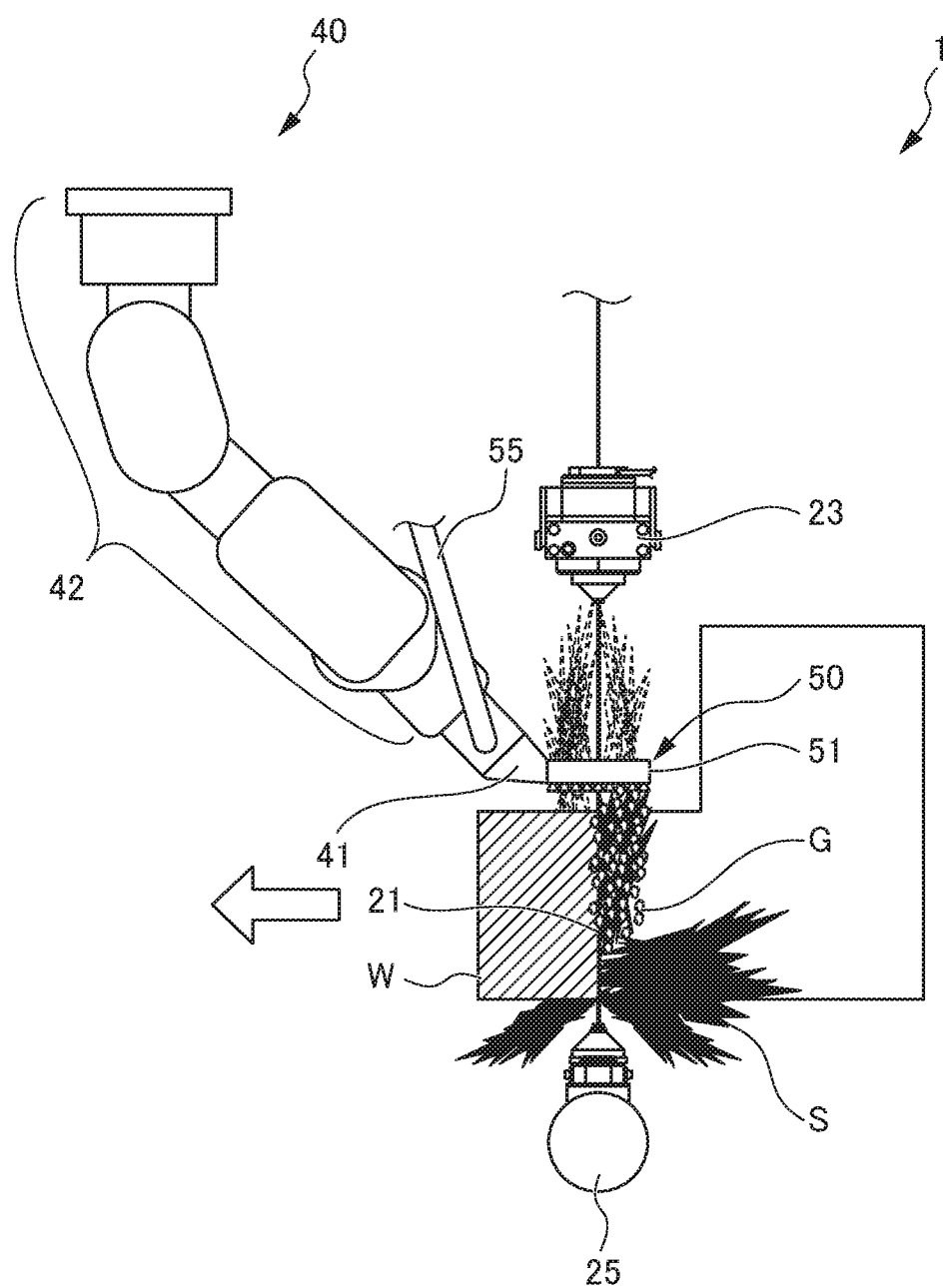
FIG. 14 is a principal part cross-sectional view showing an aspect of a thin portion of a work W in which the thickness in the vertical direction partially differs being electric discharge machined by the wire electric discharge machine 1 according to the first embodiment of the present invention.

Then, as shown in FIG. 13, after machining the portion with thick thickness in the vertical direction, when machining the portion with thin thickness in the vertical direction as shown in FIG. 14, the suction part 51 is made to move downwards along the wire electrode 21 by way of the robot 40 to be arranged at a position in the vicinity of the top face of the work W, and suctions the sludge S and gas G from the nozzles 52 of the suction part 51 with good efficiency.

According to the present embodiment, the wire electric discharge machine 1 performing electric discharge machining on the work W by causing the wire electrode 21 and work W as the workpiece to relatively move in the above way includes the robot 40, and the suction mechanism 50 which is provided to the wrist leading end 41 of the robot 40, and suctions the machining waste (sludge S) and gas G generated by wire electrical discharge machining.

By changing the posture of the suction part 51 of the suction mechanism 50 by the operation of the robot 40 in accordance with the shape of the work W and progression of wire electric discharge machining, it becomes possible to flexibly handle sludge S and gas G generating from the work W during wire electric discharge machining and which varies accompanying progression of wire electric discharge machining, and to efficiency suction the sludge S and gas G, thereby achieving improvements in machining speed and machining precision of the work W.

In addition, upon discharging the sludge S and gas G from the vicinity of the wire electrode 21, which is the electric discharge machining part, it becomes possible to perform discharge by suctioning the sludge S and gas G by the suction mechanism 50 of the robot 40, which is not dependent on the pressure and flowrate of working fluid from the upper guide part 23 and lower guide part 25, as is conventionally. Raising the efficiency of wire electric discharge machining thereby becomes possible by promoting the discharge of the sludge S and gas G from the electric discharge machining part, and thus an increase of the machining speed becomes possible.

In addition, the wire electric discharge machine 1 has the column 15 as the main body supporting the wire electrode 21, and the robot 40 is supported by the column 15. Since the column 15 and the wire electrode 21, as well as robot 41 relatively move integrally in relation to the workpiece W, it becomes possible to make performing control synchronizing the suction part 51 of the suction mechanism 50 of the wrist leading end 41 of the robot 40 with the wire electrode 21 on the robot 40 unnecessary.

In addition, the wire electrode 21 is supported by the upper guide part 23 and lower guide part 25, and the robot 40 can relatively move the suction mechanism 50 in relation to the upper guide part 23.

In the case of a configuration additionally fixing the suction mechanism part for discharging the sludge S and gas G in the vicinity of the upper guide part as is conventionally, the additionally fixed suction mechanism part is in the vicinity of the upper guide part. For this reason, in the preparatory work called "planning" which registers the position of the work W in the numerical control of the wire electric discharge machine manually or automatically using various measurement tools, the efficiency of the "planning" work declines due to becoming an obstruction when bringing the various measurement tools close to the work W.

In contrast, with the present embodiment, by changing the posture of the robot 40, it is easy to make the suction part 51 of the suction mechanism 50 installed to the wrist leading end 41 of the robot 40 relatively movable in relation to the upper guide part 23, i.e. keep at a distance from the vicinity of the upper guide part 23, etc.; therefore, preparatory work resembling that for a wire electric discharge machine without the suction mechanism 50 during "planning" work is made possible.

In addition, in the case of a configuration additionally fixing a suction mechanism part for discharging the sludge S and gas G in the vicinity of the upper guide as is conventionally, upon the operator of the wire electric discharge machine tensioning the wire electrode 21 to the wire electric discharge machine 1, and upon maintenance of the upper guide part 23, there is concern over the additionally fixed suction mechanism part and the pipe member connected to the suction mechanism part becoming obstacles.

In contrast, with the present embodiment, by changing the posture of the robot 40, since it becomes easy to keep the suction part 51 of the suction mechanism 50 installed to the wrist leading end 41 of the robot 40 at a distance from the vicinity of the upper guide part 23, similarly to a wire electric discharge machine without an suction mechanism part, tensioning of the wire electrode 21 and maintenance of the upper guide part 23 become possible.

In addition, the robot 40 is able to move the suction mechanism 50 along the wire electrode 21. In the case of a configuration additionally fixing, in the vicinity of the upper guide part, a suction mechanism part for discharging sludge S and gas G as is conventionally, in a case such as the shape of the work W changing in the plate thickness direction as in FIGS. 13 and 14, it is not possible to bring the suction mechanism part near a portion of thin plate thickness, which is an electrical discharge machining part that is a portion machining the workpiece W by way of the wire electrode.

In contrast, with the present embodiment, since positioning of the suction part 51 of the suction mechanism 50 is performed by the robot 40, it is possible to bring the suction part 51 of the suction mechanism 50 near the electric discharge machining part by changing the posture of the robot 40, even if the shape of the work W varies in plate thickness direction. For this reason, even if the shape of the plate thickness direction of the work W varies during wire electric discharge machining, by moving the suction part 51 of the suction mechanism 50 along the wire electrode 21, the suction part 51 of the suction mechanism 50 is arranged in the vicinity of the electric discharge machining part (vicinity of portion with thin plate thickness of the work W), and thus suction of sludge S and gas G from the electric discharge machining part becomes possible.

In addition, the suction mechanism 50 has the suction part 51 having a semi-circular shape, and suctioning the sludge S and gas G generated by the wire electric discharge machining. It is thereby possible to arrange the suction part 51 in a positional relationship surrounding the wire electrode 21, and arrange in a position distanced from the wire electrode 21.

In addition, the suction part 51 is arranged, relative to the wire electrode 21, at a side opposite to the machining direction of the work W by the wire electrode 21. It is thereby possible to suction the gas G and sludge S generated in abundance at the side opposite to the machining direction of the work W, by the suction part 51 of the suction mechanism 50 with good efficiency.

In addition, the suction mechanism 50 has the coupling mechanism 45 which is arranged at the wrist leading end 41 of the robot 40, and detachably couples the wrist leading end 41 of the robot 40 and the base 42 of the robot 40.

In the case of a configuration additionally fixing, in the vicinity of the upper guide part, a suction mechanism part for discharging sludge S and gas G as is conventionally, the change in shape of the additionally fixed suction mechanism part is very difficult, and in the case of the top face of the work W not being smooth, the suction of sludge S and gas G with good efficiency has been impossible.

In contrast, with the present embodiment, so long as recognizing that there is a portion of the work W in which the top face is not smooth, or a part of the top face is not smooth, upon preparing the wrist leading end 41 of the robot 40 including the suction part 51 of the suction mechanism 50 which is adapted to the shape which is not smooth in advance, it is possible to remove and change the wrist leading end 41 of the robot 40 to match the shape of the top face of the workpiece W. Suction of sludge S and gas G with good efficiency thereby becomes possible.

Next, a wire electric discharge machine 1A according to a second embodiment of the present invention will be explained while referencing FIG. 15. The wire electric discharge machine 1A according to the second embodiment differs from the wire electrical discharge machine 1 according to the first embodiment in the point of the base 42 of the robot 40 not being fixed to the column 15, but rather being fixed to the work placing table 17A. In addition, accompanying this, the control of the robot controller 35 on the robot 40 differs. Since other configurations are similar to the wire electric discharge machine 1 according to the first embodiment, the same reference symbols are assigned for configurations similar to the respective configurations of the first embodiment, and explanations thereof are omitted.

Figure 15:
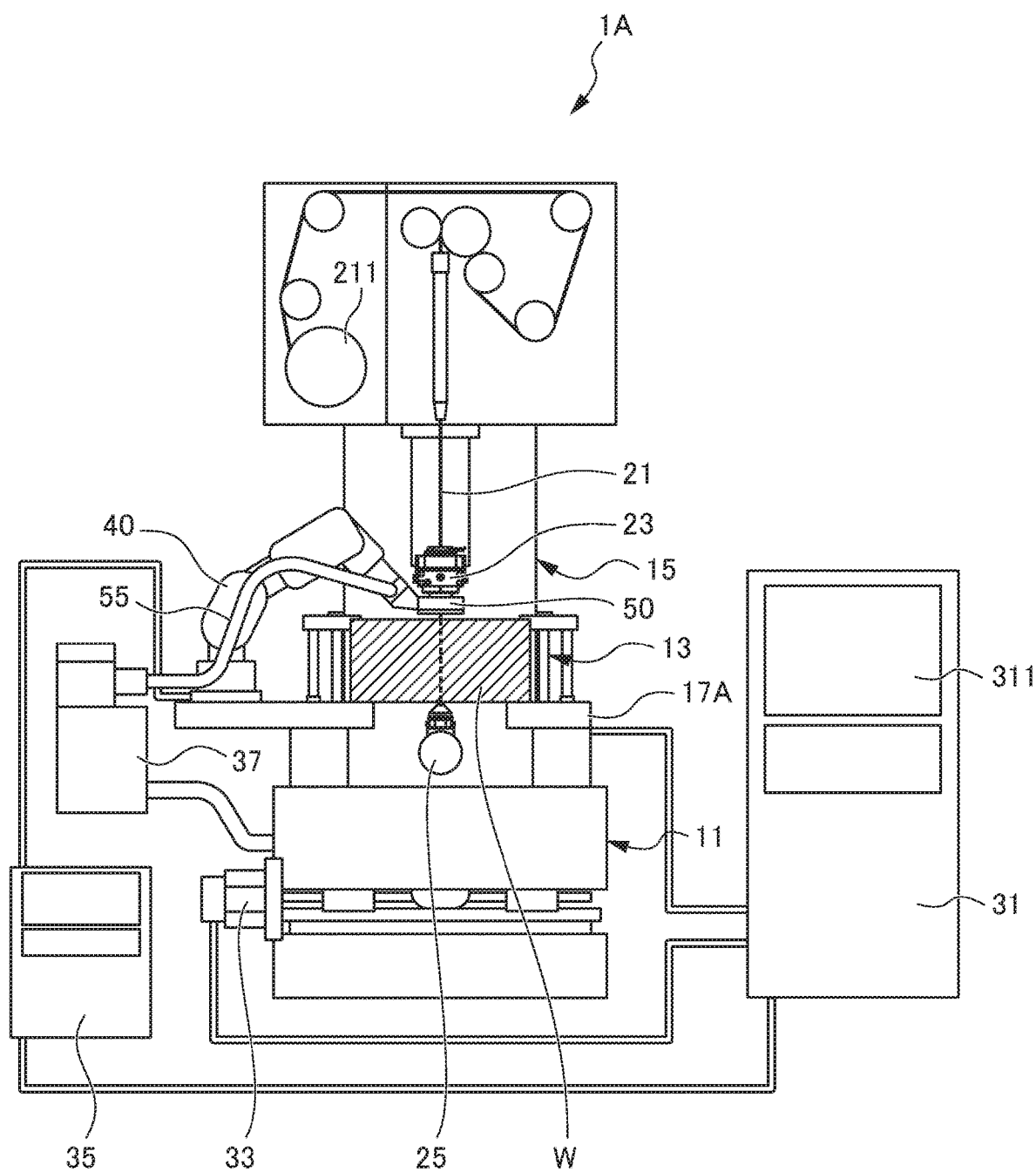
FIG. 15 is an outline front view showing a wire electric discharge machine 1A according to a second embodiment of the present invention.

As shown in FIG. 15, the base 42 of the robot 40 is not fixed to the column 15, but rather is fixed to the work placing table 17A. For this reason, the base 42 of the robot 40 relatively moves in relation to the wire electrode 21 integrally with the work W and the work placing table 17A supporting the work W. The robot controller 35 as a synchronous control means performs control to synchronize the suction part 51 of the wrist leading end 41 of the robot 40 with the movement of the wire electrode 21 which is relatively moving in relation to the work W serving as the workpiece, and establishes the positional relationship of the suction part 51 relative to the wire electrode 21 such as that shown in FIG. 14.

According to such a configuration, even in a case of the base 42 of the robot 40 not integrally moving in relation to the electric discharge machining part which is a portion of the wire electrode 21 that performs electrical discharge machining on the work W, the efficient suction of sludge S or gas G is possible by arranging the suction part 51 of the suction mechanism 50 at an appropriate position in the vicinity of the wire electrode 21 during electric discharge machining.

Although embodiments of the present invention have been explained above, the present invention is not to be limited to the aforementioned embodiments. In addition, the effects described in the present embodiment are merely listing the most preferred effects produced from the present invention, and the effects according to the present invention are not to be limited to those described in the present embodiment.

For example, the configurations of each part of the wire electric discharge machine are not limited to the configurations of each part of the wire electric discharge machines 1, 1A in the present embodiment. More specifically, for example, the configuration of the suction mechanism is not limited to the suction mechanism 50 of the present embodiment. In addition, the portion of the robot 40 to which the base 42 is fixed is not limited to the column 15 or work placing table 17. Furthermore, the configuration of the coupling mechanism is not limited to the configuration of the coupling mechanism 45 of the present embodiment. Moreover, the tensioning of the release rod 464 of the base 42 of the robot 40 by driving the pneumatic cylinder Cy, and the tensioning of the release rod 454 of the wrist leading end 41 of the robot 40 by the hand H of the operator of the wire electric discharge machine 1 are not limited to this. For example, the release rod 464 of the base 42 of the robot 40 may be tensioned by the hand H of the operator, or the release rod 454 of the wrist leading end 41 of the robot 40 may be tensioned by driving the pneumatic cylinder Cy.

EXPLANATION OF REFERENCE NUMERALS

1 wire electric discharge machine
15 column (main body)
23 upper guide part
25 lower guide part
35 robot controller (synchronous control means)
40 robot (articulated robot)
41 wrist leading end (leading end part)
42 base
45 coupling mechanism
50 suction mechanism
51 suction part
G gas
S sludge (machining waste)
W work (workpiece)

What is claimed is:

1. A wire electric discharge machine that causes a wire electrode and a workpiece to move relatively, and performs electric discharge machining on the workpiece, the wire electric discharge machine comprising:
    an articulated robot; and
    a suctioning waste and gas remover that is provided to a leading end part of the articulated robot, and suctions machining waste and gas generated by wire electric discharge machining and conveys the machining waste and gas away from the workpiece through a pipe, wherein
    posture of the suctioning waste and gas remover is changeable by an operation of the articulated robot in accordance with progression of the wire electric discharge machining, and
    the suctioning waste and gas remover has a robot coupler comprising a pair of projections and a pair of rotating engagement members that are disposed at the leading end part of the articulated robot and a base of the articulated robot, and are configured to detachably couple the leading end part of the articulated robot and the base of the articulated robot.

2. The wire electric discharge machine according to claim 1, further comprising a robot controller that synchronizes the articulated robot to movement of the wire electrode that relatively moves in relation to the workpiece.

3. The wire electric discharge machine according to claim 1, further comprising a main body that supports the wire electrode,
    wherein the articulated robot is supported by the main body.

4. The wire electric discharge machine according to claim 1,
    wherein the wire electrode is supported by an upper guide part and a lower guide part, and
    wherein the articulated robot can relatively move the suctioning waste and gas remover in relation to the upper guide part.

5. The wire electric discharge machine according to claim 1, wherein the articulated robot can move the suctioning waste and gas remover along the wire electrode.

6. The wire electric discharge machine according to claim 1, wherein the suctioning waste and gas remover has a suction part having a semi-circular ring shape and that suctions the machining waste and gas generated by the wire electric discharge machining.

7. The wire electric discharge machine according to claim 6, wherein the suction part is disposed, relative to the wire electrode, at an opposite side in a machining direction of the workpiece by the wire electrode.

* * * * *